(12) United States Patent
Ward et al.

(10) Patent No.: US 10,706,426 B2
(45) Date of Patent: Jul. 7, 2020

(54) AUTOMATED REMOTE TRANSACTION ASSISTANCE

(71) Applicant: NCR Corporation, Duluth, GA (US)

(72) Inventors: Joseph Ward, Highland, UT (US); Jeffrey Christensen, Riverton, UT (US)

(73) Assignee: NCR Corporation, Atlanta, GA (US)

( * ) Notice: Subject to any disclaimer, the term of this patent is extended or adjusted under 35 U.S.C. 154(b) by 804 days.

(21) Appl. No.: 14/266,392

(22) Filed: Apr. 30, 2014

(65) Prior Publication Data

US 2015/0317639 A1   Nov. 5, 2015

(51) Int. Cl.
| | |
|---|---|
| G06Q 30/02 | (2012.01) |
| G06Q 30/06 | (2012.01) |
| G06Q 10/10 | (2012.01) |
| G06Q 30/00 | (2012.01) |
| G06Q 40/02 | (2012.01) |
| G06Q 20/32 | (2012.01) |
| G06Q 20/18 | (2012.01) |
| G07F 9/02 | (2006.01) |
| G06Q 20/10 | (2012.01) |
| G07F 19/00 | (2006.01) |

(52) U.S. Cl.
CPC ......... *G06Q 30/016* (2013.01); *G06Q 20/108* (2013.01); *G06Q 20/18* (2013.01); *G06Q 20/322* (2013.01); *G06Q 40/025* (2013.01); *G07F 9/026* (2013.01); *G07F 19/209* (2013.01)

(58) Field of Classification Search
CPC .... G06Q 20/108; G06Q 20/18; G06Q 20/322; G06Q 40/025; G06Q 9/026; G06Q 19/209; G07F 19/209; G07F 9/026

USPC .................................. 705/1.1–912, 316, 346
See application file for complete search history.

(56) References Cited

U.S. PATENT DOCUMENTS

| | | | | |
|---|---|---|---|---|
| 5,231,571 A | * | 7/1993 | D'Agostino | G06Q 30/02 705/27.1 |
| 6,046,762 A | * | 4/2000 | Sonesh | H04M 3/51 348/14.11 |
| 6,359,892 B1 | * | 3/2002 | Szlam | H04M 3/42229 370/401 |
| 6,636,888 B1 | * | 10/2003 | Bookspan | G06Q 10/109 709/200 |
| 6,859,197 B2 | * | 2/2005 | Klein | G06F 1/1626 345/156 |

(Continued)

FOREIGN PATENT DOCUMENTS

| | | |
|---|---|---|
| WO | 9908215 | 2/1999 |
| WO | 2013102654 | 7/2013 |

OTHER PUBLICATIONS

The Financial Brand: "iPhone, iPad Video Banking Could Spell The End For Branches", Sep. 28, 2012 (Sep. 28, 2012), XP055201146, Retrieved from the Internet: URL: http://thefinancialbrand.com/25363/asb-video-banking/ [retrieved on Jul. 8, 2015]* the whole document*.

*Primary Examiner* — Jonathan P Ouellette
(74) *Attorney, Agent, or Firm* — Schwegman, Lundberg & Woessner (57) ABSTRACT

A customer uses a customer device to interact with an expert using a remote device in a real-time communication session. The expert drives the interactions and can activate peripherals on the customer device to capture information, which is automatically sent from the customer device to the remote device for consumption by the expert.

19 Claims, 4 Drawing Sheets

(56) References Cited

U.S. PATENT DOCUMENTS

| | | | | |
|---|---|---|---|---|
| 7,505,921 B1* | 3/2009 | Lukas | ................ | G06Q 30/0603 705/26.5 |
| 7,814,016 B2* | 10/2010 | Pranger | ................ | G06Q 20/108 705/42 |
| 7,848,984 B1* | 12/2010 | Robb | ................ | G06F 9/54 705/35 |
| 7,890,405 B1* | 2/2011 | Robb | ................ | G06F 9/54 705/35 |
| 8,228,299 B1* | 7/2012 | Maloney | ................ | G06Q 20/14 345/173 |
| 8,379,830 B1* | 2/2013 | Naik | ................ | H04M 3/493 379/265.02 |
| 8,533,857 B2* | 9/2013 | Tuchman | ................ | H04L 63/104 726/28 |
| 8,651,373 B1* | 2/2014 | Block | ................ | G06Q 20/1085 235/379 |
| 8,706,498 B2* | 4/2014 | George | ................ | H04M 3/4936 379/265.01 |
| 8,751,393 B1* | 6/2014 | Murray | ................ | G06Q 40/02 705/35 |
| 8,755,510 B2* | 6/2014 | Erbey | ................ | G06Q 30/016 379/265.02 |
| 8,833,639 B1* | 9/2014 | Hopkins, III | ................ | G06Q 20/1085 235/375 |
| 9,042,540 B2* | 5/2015 | Tuchman | ................ | H04M 3/5166 379/265.09 |
| 9,245,287 B2* | 1/2016 | Gechter | ................ | G06Q 30/06 |
| 9,760,947 B2* | 9/2017 | Murray | ................ | G06Q 40/02 |
| 2001/0000733 A1 | 7/2001 | Kjonaas et al. | | |
| 2003/0037341 A1* | 2/2003 | Van Der Meulen | ... | G08C 17/02 725/143 |
| 2003/0138135 A1* | 7/2003 | Chung | ................ | G06K 7/10346 382/119 |
| 2004/0139156 A1* | 7/2004 | Matthews | ................ | G09B 7/00 709/204 |
| 2004/0169722 A1* | 9/2004 | Pena | ................ | G07F 17/16 348/14.01 |
| 2007/0186002 A1* | 8/2007 | Campbell | ................ | H04N 7/142 709/231 |
| 2007/0265949 A1* | 11/2007 | Elder | ................ | G06Q 40/00 705/35 |
| 2013/0182973 A1* | 7/2013 | Macciola | ................ | H04N 1/387 382/293 |
| 2014/0108557 A1* | 4/2014 | Calman | ................ | G06Q 10/101 709/205 |
| 2014/0258110 A1* | 9/2014 | Davis | ................ | G06Q 20/227 705/41 |
| 2015/0227902 A1* | 8/2015 | Bertanzetti | ................ | G06Q 20/108 705/42 |
| 2015/0317628 A1* | 11/2015 | Rossmann | ................ | G07F 19/209 705/43 |

* cited by examiner

AUTOMATED REMOTE TRANSACTION ASSISTANCE

BACKGROUND

Increasingly, enterprises are deploying Self-Service Terminals (SSTs) at various locations for use by consumers. The locations can include financial institutions, grocery stores, retail stores, government venues, entertainment venues, gaming venues, transportation venues, and the like.

SSTs have made transactions easier for enterprises and consumers. Consumers can now even conduct transactions with enterprises via their mobile devices.

However, some transactions are currently not well-suited for SSTs and mobile devices. These are transactions where documentation may be needed, signatures may be needed, two or more party interaction may be required, and others.

One such transaction that is not presently conducive for mobile or SST processing is loan transactions. A loan officer may need access to documents that he/she does not have, may require signatures on documents where the debtor is not present, may require proof of identification for the debtor, may need proof of income, and the like.

Thus, to date loan transactions and other similar situated transactions (passport processing, etc.) have largely not been automated to any significant degree and still largely require the physical presence of the consumer, particularly during closings. These types of transactions are not available at SSTs and are not conducted via mobile devices of the consumers.

SUMMARY

In various embodiments, methods and an SST for automated remote transaction assistance are presented.

According to an embodiment, a method for automated remote transaction assistance is provided. Specifically, a local device is connected to a remote device and a customer operating the local device engages in a communication session with an expert operating the remote device. Next, information is captured on the local device at the direction of the expert and the information is automatically sent from the local device to the remote device once captured during the communication session.

DETAILED DESCRIPTION

Figure 1:
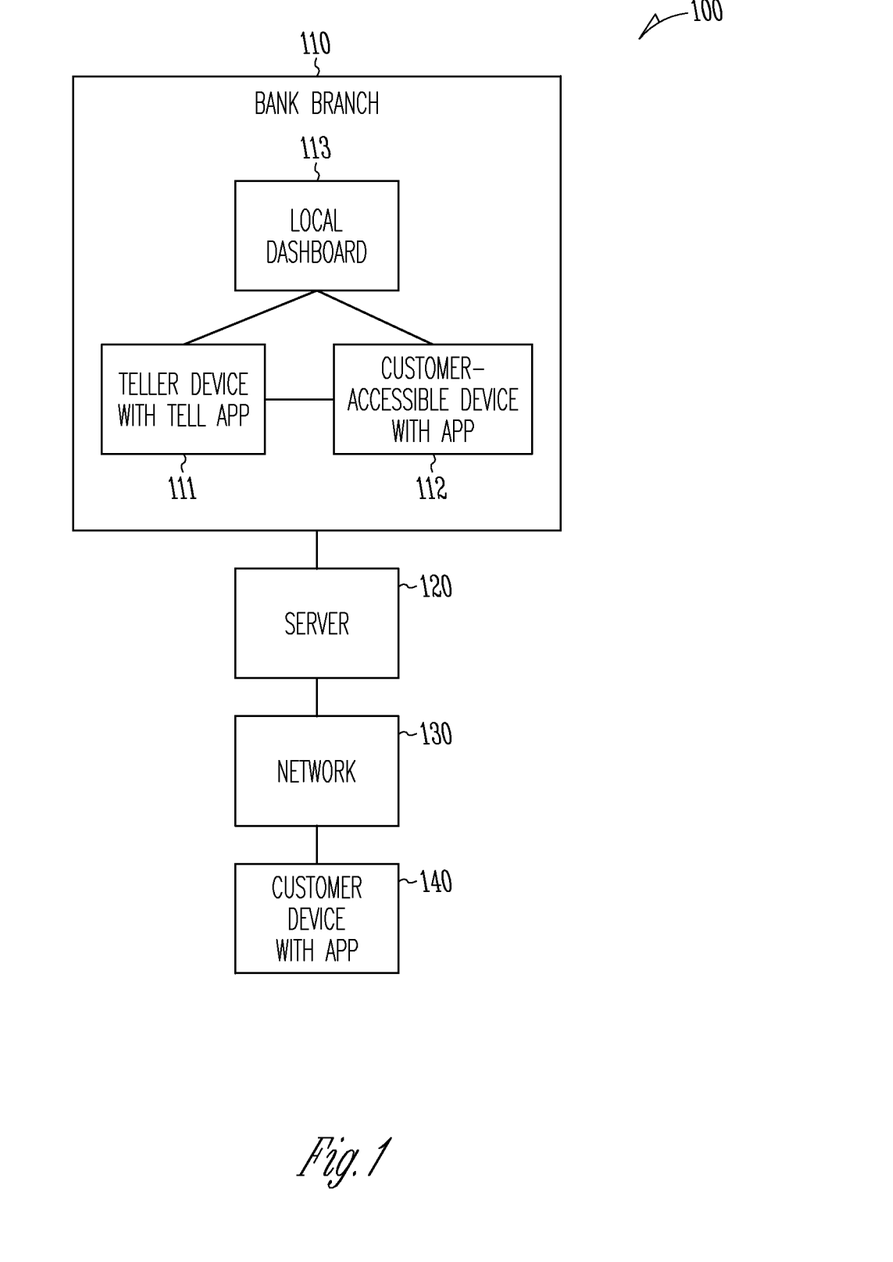
FIG. 1 is a diagram of components for practicing automated remote transaction assistance, according to an example embodiment.

FIG. 1 is a diagram 100 of components for practicing automated remote transaction assistance, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of automated remote transaction assistance, presented herein and below.

Furthermore, the methods and portable terminal presented herein and below for automated remote transaction assistance can be implemented in whole or in part in one, all, or some combination of the components shown with the diagram 100. The methods are programmed as executable instructions in memory and/or non-transitory computer-readable storage media and executed on one or more processors associated with the components.

Specifically, the diagram 100 permits automated remote transaction assistance utilizing applications executing on the components. The details of this approach in view of the components, within the diagram 100, are now presented with reference to some embodiments of the FIG. 1 within the context of a bank branch 110.

However, before discussion of the diagram 100 is presented, it is to be noted that the methods and portable terminal presented herein and below are not limited to just the banking industry; that is, any enterprise, any SST terminal (kiosk, vending machine, check-in and/or check-out terminal, such as those used in retail, hotel, car rental, healthcare, or financial industries, etc.), or any portable terminal (mobile phone, wearable processing device, touch-screen device, laptop computer, tablet, etc.) can benefit from the automated remote transaction assistance discussed herein.

The diagram 100 includes a bank branch 110, a server 120, a network 130, and an end-user device with an application (app) 140. Moreover, the bank branch 110 includes a teller device with a teller application (app) 111, a customer-accessible device with an application (app) 112, and, optionally a dashboard 113.

The techniques and features of automated remote transaction assistance are illustrated with reference to the components of the diagram 100 for a transaction being handled by a bank for one or more customers of that bank. For this embodiment, the transaction is a loan or the closing of a loan, where the customer is the debtor and the bank is the creditor. It is noted that the bank associated with the bank branch 110 can have many other branches that span the globe, the single bank branch is shown for purposes of ease of comprehension only.

During the loan transaction process (such as closing or while the loan is in process), a variety of information may be needed by the loan officer of the bank or the underwriter used by the bank. These individuals are likely not located at the bank branch 100, which is convenient for the customer to get to for purposes of supplying documents or signing documents needed by the loan officer of the underwriter.

The customer has a few options with the teachings presented herein that were previously not available. This also speeds up the loan processing but getting the loan officer or underwriter the documents and signatures that they need in a timely manner to conclude a decision on the requested loan or to close the loan.

In a first embodiment, the customer can go to the bank branch 110 and access a customer-accessible device having the application 112. In an embodiment, this is a designated space within the bank branch 110, perhaps having a couch, a table, etc. In this embodiment, the customer-accessible device with the application 112 can include a monitor, a camera, a microphone, one or more input mechanisms (such as a keyboard, a mouse, a stylus, and the like), and a processing unit, which may or may not be visible to the customer. The processing unit executes the application of the customer-accessible device with the app 112.

The app is configured to receive and respond to instructions from a remote app controlled by the loan officer or underwriter. The initial connection between the customer and the loan officer or underwriter can be done in a variety of ways. Initiated by the customer from the customer-accessible device with the app 112 when the customer is ready. Initiated by the loan officer of the underwriter when the customer is present in front of the camera or answers a video call using the customer-accessible device with the app. In another case, a teller can establish the connection using the teller device with app 111. The teller can also monitor the interactions between the customer and the loan officer or underwriter via the teller device with app 111.

Once the connection is made, the apps of the loan officer's device (not shown in the FIG. 1) and the customer-accessible device with the app 112 provide a real time video and messaging feed between the two parties to provide the customer and the loan officer or underwriter with assistance as needed during the communication session between the two.

Moreover, the apps permit the loan officer or underwrite to activate controls and issue commands to peripherals and control what the app on the customer-assisted device 112 does. So, the loan officer can pop-up on a screen of the monitor of the customer-assisted device 112 a document for the customer to review or print the document for the customer to review (local to the customer at a printer accessible to the customer-assisted device 112). The loan officer or underwriter can also activated a camera on the customer-assisted device (though the apps) to acquire information, such as an image of the customer, an image of a passport provided by the customer, an image of a paystub, an image of a driver's license, and any other relevant image for documents needed by the loan officer or underwriter. The loan officer or underwriter can also activate a signature block on a screen of the monitor for the customer-assisted device 112 and the customer can use a finger or a stylus to sign on the signature block on the screen (touch screen). In other cases, perhaps a separate peripheral for signing is interfaced to the customer-assisted device and the loan officer or underwriter instructs the customer to sign using the signature peripheral.

It is noted that any expert needed by the customer can be on the other end of the communication session and does not have to just be a loan officer or underwriter. So, a mortgage expert, insurance expert, investment expert, and others can be used by the customer for the transaction. Also, the expert (loan officer, underwriter, mortgage expert, insurance expert, etc.) does not have to be the one that initiates the communication. That is, the customer may make an inquiry for a particular expert and the teller instructs the customer to go sit in the area of the customer-assisted device with app 112 and notifies the bank expert and then the bank expert makes the connection to the session (but it was initiated by the customer). So, the transaction may be a first step in the processor of obtaining some service of the bank.

In a second embodiment, the customer is either contacted or makes a first contact for an expert of a bank for purposes of assisting in an on-going transaction that the customer has with the bank or for purposes of stating a transaction with a bank through an expert. In this embodiment, the customer does not want to visit the bank branch 110. So, the customer uses his/her own end-user device with the app 140. This device 140 can be a laptop, a desktop, a tablet, a phone, or a wearable processing device (such as GOOGLE™ GLASS™). So, the initial connection occurs over the network 130 through the server 120 with an expert that may or may not be at the bank branch 110 (in which case the network routes to the location of the expert). The network can be a wired, wireless, or a combination of both wired and wireless. The expert can initiate a video call or the customer via the end-user device with the app 140 can request a generic expert related to a specific area that the bank provides experts in. When the customer initiates the call, the app on the end-user device may provide a browsing interface such that the customer selects a particular expert, such as a loan officer, the app then routes the call to one of the bank's loan officers.

Once the video session is established, similar to what was discussed above, the expert (using a remote app that communicates with the app on the end-user device 140) can take control gain access to integrated devices and peripherals of the end-user device 140 to do the same operations for purposes of acquiring images, sending documents, receiving documents, printing on behalf of the customer, and acquiring the customer's signatures on documents. However, in some embodiments, when not desired by the customer, the control of associated with activating peripherals for the camera, any printer, or signature (in the case of a phone on the touchscreen of the phone) can be retained by the customer, such that the customer activates the devices when instructed by the expert on the video conference or after the expert causes the app on the end-user device to provide a presented message asking the customer to print something, activate the camera and take an image of something, etc. The ability to take full control exists but based on customer preference can be disabled such that control of devices associated with the end-user device remains with the customer and not the remote expert.

The remote app of the expert is configured to interact with the app of the customer (on the customer's own device or a device the customer is accessing at a bank branch). The expert and customer engage in a real-time live video session and the expert uses the remote app to acquire information from the customer that the expert needs and can provide information to the customer that the customer should retain or print for review. The information can be documents, images of documents, images of people or identity cards and the like. Moreover, text and email messages can be used during the session to send and receive documents and/or images. In some cases, faxes can be sent and received between the expert and the customer as well.

The local dashboard 113 of the bank branch provides a monitoring of the transaction and other transaction occurring within the bank branch 110.

Moreover, in an embodiment, the teller device with the teller app 111 is operated by the expert that the customer interacts with at the customer-accessible device with the app 112.

In an embodiment, the customer-accessible device is a separate and secure interface on an Automated Teller Machine (ATM) within the bank branch 110, the secure interface isolated on the ATM from the ATM transaction interface for security. So, the customer could approach an ATM at the bank branch 110 and access the secure interface to obtain a real time and live connection and interaction with a bank expert. In this manner the app of the customer-assisted device can operate on existing bank Self-Service Terminals (SST).

In another embodiment, the customer-assisted device is a kiosk, such as a self-service grocery store checkout station or any other kiosk that executes app of the customer-assisted device. So, the customer could receive expert assistance for an on-going or newly initiated transaction on any SST enabled to execute the app, such that it can be considered a customer-assisted device.

One now appreciates how customers can be served with newer technologies to initiate or assist in ongoing transaction that conventionally would require in-person and face-to-face interaction but with the teachings herein can occur in any location having a device that executes the app to be considered a customer-assisted device or on the customer's own devices having that app. This provides convenience and expedites ongoing transactions and may generate new customers that keep putting off acquiring an expert for a transaction because of the inconvenience associated with the traditional procedure but would gladly engage an expert for a transaction with the convenience of the teachings presented herein. Still further, some transactions such as closing loans are often delayed because the customer has to physically appear or provide something in person before the loan can be closed, such transactions can be closed much quicker with the teachings herein to the benefit of the customer and the loaning organization.

Some of these embodiments and other embodiments are now discussed with reference to the FIGS. 2-4.

Figure 2:
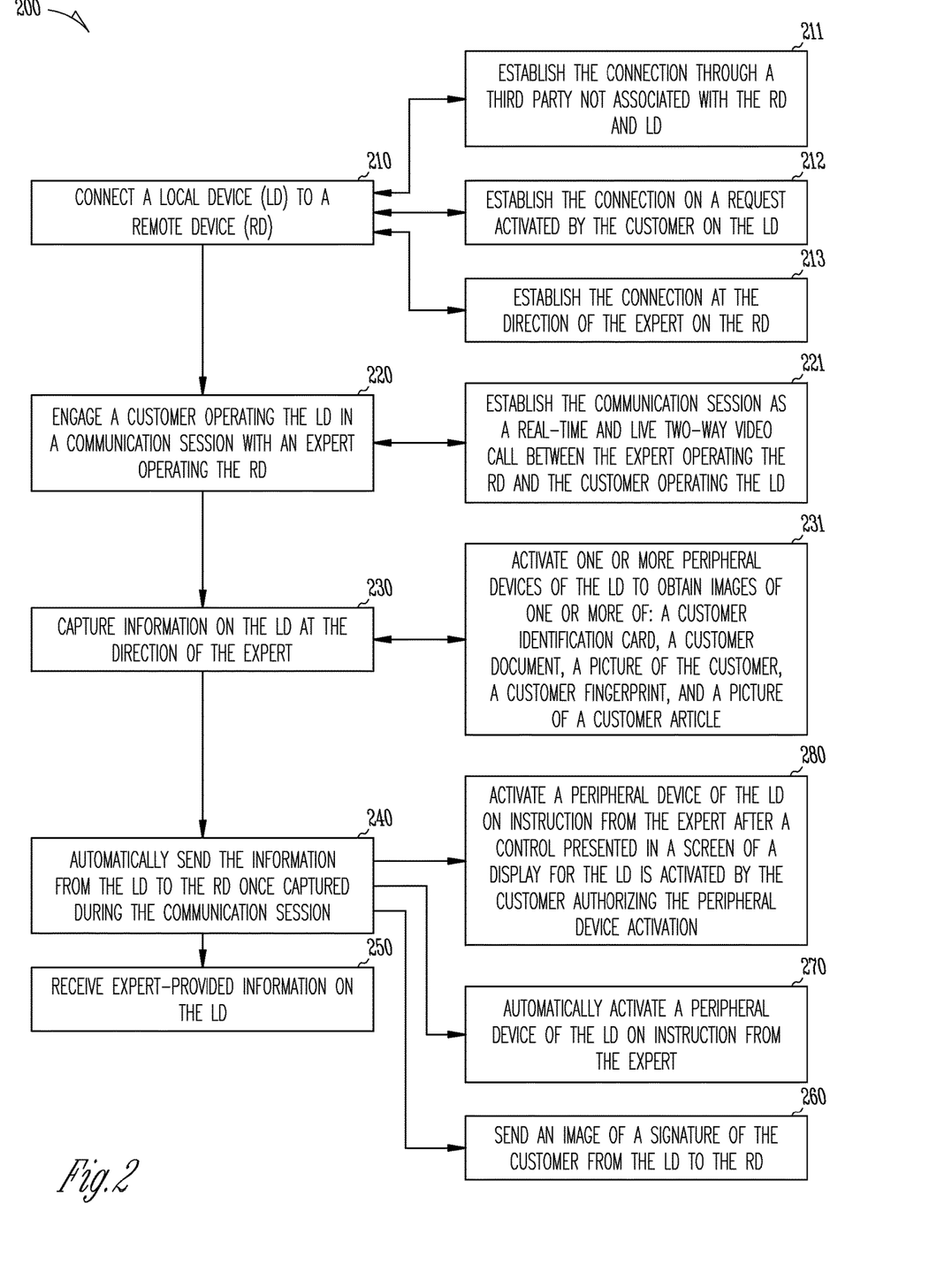
FIG. 2 is a diagram of a method for automated remote transaction assistance, according to an example embodiment.

FIG. 2 is a diagram of a method 200 for automated remote transaction assistance, according to an example embodiment. The software module(s) that implements the method 200 is referred to as a "customer-assisted application." The customer-assisted application is implemented as executable instructions programmed and residing within memory and/or a non-transitory computer-readable (processor-readable) storage medium and executed by one or more processors of a client-accessible device. The processor(s) of the device that executes the customer-assisted application are specifically configured and programmed to process the customer-assisted application. The customer-assisted application has access to a network during its processing. The network can be wired, wireless, or a combination of wired and wireless.

In an embodiment, the device that executes the assistance manager is the customer-accessible device 112 of the FIG. 1.

In an embodiment, the device that executes the customer-assisted application is the end-user device 140 of the FIG. 1.

In an embodiment, the device that executes the customer-assisted application is an ATM.

In an embodiment, the device that executes the customer-assisted application is a SST.

The processing of the customer-assisted application is from the perspective of a device operated by a customer, which can be accessed at an enterprise and not owned by the customer or which can be owned by the customer (desktop, tablet, phone, laptop, wearable processing device, etc.).

At 210, the customer-assisted application connects a local device to a remote device. The initiating party can vary.

For example, at 211, the customer-assisted application establishes the connection through a third party not associated with the remote device and the local device. For instance, a the customer-assisted application can be configured to present an interface on a screen of a display of the local device and allow the customer to browser or search for experts related to a transaction that the customer is interested in and select a particular area. This causes the customer-assisted application to contact a third-party referral service that locates the expert desired and facilitates the connection with that expert. In one embodiment of the FIG. 1, this third-party was a teller (in other embodiments, the teller was the expert).

In another case, at 212, the customer-assisted application establishes the connection on a request activated by the customer on the local device. Here, the customer-assisted application provides an interface and when the customer selects the expert a direct connection is made to that expert. This may be a known expert to the customer for an ongoing transaction or a new transaction for which the expert is desired by the customer for whatever reason.

In yet another situation, at 213, the customer-assisted application establishes the connection at the direction of the expert on the remote device. Here, either the customer had previously requested a call back from this particular expert or the customer has an ongoing transaction with the expert and the expert is in need of documents and other information from the customer, such that the expert makes the connection to the customer through the customer-assisted application.

At 220, the customer-assisted application engages a customer operating the local device in a communication session with the expert who is operating the remote device.

In an embodiment, at 221, the customer-assisted application establishes the communication session as a real-time live two-way video call between the expert operating the remote device and the customer operating the local device, which is executing the customer-assisted application.

At 230, the customer-assisted application captures information on the local device at the direction of the expert. This can be a variety of captured information as was discussed above with reference to the FIG. 1.

According to an embodiment, at 231, the customer-assisted application activates one or more peripheral devices of the local device to obtain images of one or more of: a customer document, a picture of the customer, a customer fingerprint, and a picture of some article of the customers (property, perhaps, expert is insurance adjustor and the image is of a damaged vehicle or house of the customer).

At 240, the customer-assisted application automatically sends the information from the local device to the remote device once captured during the communication session. That is, there does not have to be any action on the part of the customer to send the information once it was captured.

In an embodiment, at 250, the customer-assisted application receives expert provided information. So, the information exchange can be two-way during the session. This may happen when the expert needs the customer to review and acknowledge a legal disclosure that the customer must acknowledge reviewing before signing, or perhaps the customer wants to review a document that the customer cannot recall that is relevant to the transaction with the expert.

In an embodiment, at 260, the customer-assisted application sends an image of the customer's signature from the local device to the remote device. Here, the expert needs a signature on a document for purposes of the transaction with the customer.

In an embodiment, at 270, the customer-assisted application automatically activates a peripheral device of the local device on instruction from the expert. This occurs without any action of the customer and it is a peripheral associated with the customer's local device.

Alternatively, and in an embodiment, at 280, the customer-assisted application activates a peripheral device of the local device on instruction from the expert but after a control presented in a screen of a display for the local device is activated by the customer authorizing (providing consent for) the peripheral device activation.

Figure 3:
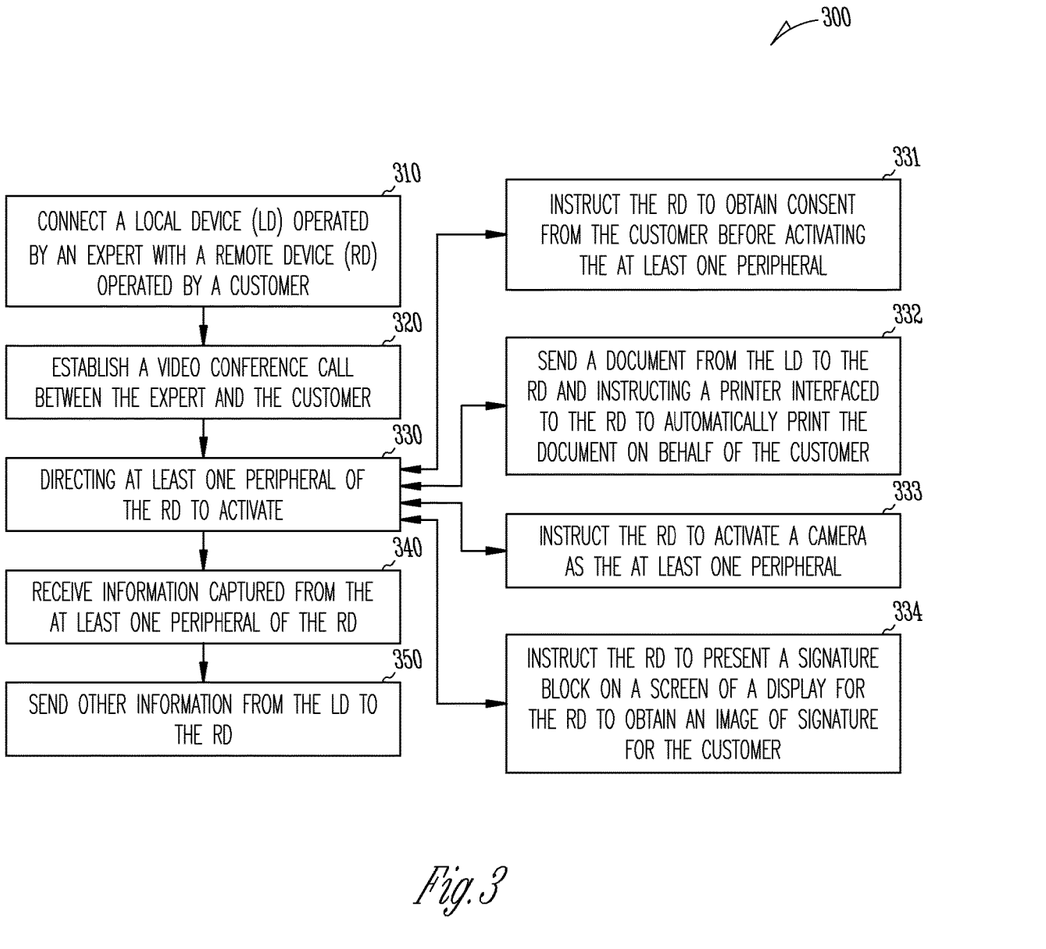
FIG. 3 is a diagram of another method for automated remote transaction assistance, according to an example embodiment.

FIG. 3 is a diagram of another method 300 for automated remote transaction assistance, according to an example embodiment. The software module(s) that implements the method 300 is referred to as an "expert application." The expert application is implemented as executable instructions programmed and residing within memory and/or a non-transitory computer-readable (processor-readable) storage medium and executed by one or more processors of an expert operated device. The processors that execute the expert application are specifically configured and programmed to process the expert application. The expert application has access to a network during its processing. The network can be wired, wireless, or a combination of wired and wireless.

In an embodiment, the device that executes the expert application is the teller device 111 of the FIG. 1.

The processing perspective of the expert application is from that of a device operated by an expert. The expert application interacts in real time over the network with the customer-assisted application of the FIG. 2. Thus, as used herein with the FIG. 3, the customer-device is remote to the local device of the expert. In the FIG. 2 the processing perspective was from that of the customer device, such that the customer device was local and the expert device was remote; however, that is reversed herein with respect to the discussion of the devices because the local device in the FIG. 3 is the expert device and the remote device is the customer device.

At 310, the expert application connects a local device operated by an expert with a remote device operated by a customer. This connection can be initiated by a third-party, by the expert, or by the customer (similar to the FIG. 2).

At 320, the expert application establishes a video conference call between the expert and the customer.

At 330, the expert application directs at least one peripheral of the remote device to activate.

In an embodiment, at 331, the expert application instructs the remote device to obtain consent from the customer before activating the at least one peripheral. This can be a default scenario but can be changed based on a customer profile where the customer authorizes the remote activation without having to select the control giving consent.

In an embodiment, at 332, the expert application sends a document from the local device to the remote device and instructs a printer interfaced to the remote device to automatically print the document on behalf of the customer.

In an embodiment, at 333, the expert application instructs the remote device to activate a camera as the at least one peripheral.

In an embodiment, at 334, the expert application instructs the remote device to present a signature block on a screen of a display for the remote device to obtain an image of the customer's signature.

At 340, the expert application receives information captured from the at least one peripheral device of the remote device.

According to an embodiment, at 350, the expert application sends other information from the local device to the remote device. So, information passing can be two-way between the expert and the customer during the transaction.

Figure 4:
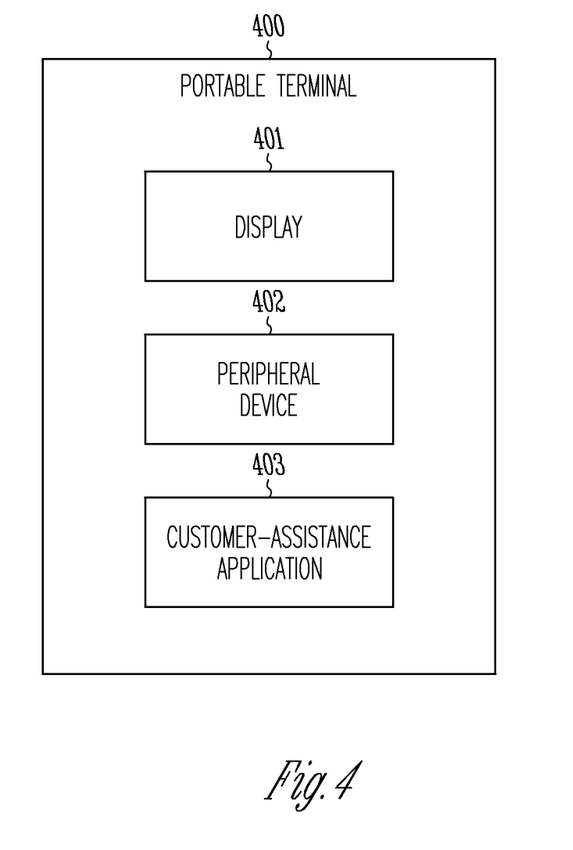
FIG. 4 is a diagram of a portable terminal, according to an example embodiment.

FIG. 4 is a diagram of portable terminal 400, according to an example embodiment. The components of the portable terminal 400 are programmed and reside within memory and/or a non-transitory computer-readable medium and execute on one or more processors of the SST 400. The portable terminal 400 communicates one or more networks, which can be wired, wireless, or a combination of wired and wireless.

In an embodiment, the portable terminal 400 is the ATM.

In an embodiment, the portable terminal 400 is a kiosk.

In an embodiment, the portable terminal 400 is a self-service grocery checkout station.

In an embodiment, the portable terminal 400 is a touchscreen device.

In an embodiment, the portable terminal 400 is a mobile phone.

In an embodiment, the portable terminal 400 is a wearable processing device.

In an embodiment, the portable terminal 400 is a SST.

In an embodiment, the portable terminal 400 is a laptop computer.

In an embodiment, the portable terminal 400 is a tablet.

The portable terminal 400 includes a display 401, a peripheral device, and a customer-assistance application 403.

The customer-assistance manager 403 is configured and adapted to: execute on the portable terminal 400, establish a communication session with a remote expert on at least one screen of the display 401, capture images representing information for a customer using the peripheral device 402 on the direction of the remote expert, and automatically send the information to the remote expert during the communication session.

According to an embodiment, the customer-assistance manager 403 is further adapted and configured to establish a live and real-time video feed between the remote expert and the customer.

In an embodiment, the customer-assistance manager 403 is further adapted and configured to receive other information from the expert for presentation to the customer during the communication session.

One now appreciates how automated remote transaction assistance can be achieved via an expert that is remote from a customer, where the expert has control of peripherals of the customer device and the customer device captures information that is automatically sent to the expert. These techniques presented herein permit transactions that remain mostly manual to be achieved in manners irrespective of customer location and at times convenient to the customer.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
connecting a local device to a remote device during a transaction being processed on the local device;
engaging the local device in a communication session with the remote device during the transaction;
capturing information on the local device at the direction of the remote device that causes a peripheral camera integrated into the local device to activate and capture the information as a picture of a customer or an image document presented in front of the peripheral camera of the local device, wherein capturing further includes activating the peripheral camera without a customer consent of the customer when a customer profile associated with the customer includes authorization to control the peripheral camera remotely without the customer consent of the customer and obtaining the customer consent when the customer profile indicates control requires the customer consent, wherein activating further includes providing control to integrated devices and peripherals of the local device to the remote device during the communication session, wherein providing control further includes printing a specific document from a peripheral printer of the local device during the communication session after obtaining customer consent to access the peripheral printer based on the customer profile, wherein activating further includes obtaining a signature provided on a screen of a peripheral display associated with the local device during the communication after obtaining customer consent to activate a signature block within the screen of the peripheral display based on the customer profile; and
automatically sending the information from the local device to the remote device once captured during the communication session in continuance of ongoing transaction.

2. The method of claim 1 further comprising, receiving expert-provided information on the local device.

3. The method of claim 1 further comprising, sending an image of the signature of the customer from the local device to the remote device.

4. The method of claim 1 further comprising, automatically activating a specific one of the peripheral devices of the local device based on instruction from the remote device.

5. The method of claim 1 further comprising, activating the display of the local device on instruction from the remote device after a control presented in a second screen of the display for the local device is activated from the local device authorizing the peripheral display activation.

6. The method of claim 1, wherein connecting further includes establishing the connection with a third device that is not associated with the remote device and local device.

7. The method of claim 1, wherein connecting further includes establishing the connection on a request activated from the local device.

8. The method of claim 1, wherein connecting further includes establishing the connection at the direction of the remote device.

9. The method of claim 8, wherein engaging further includes establishing the communication session as a real-time and live two-way video call between an expert operating the remote device and the customer operating the local device.

10. The method of claim 1, wherein capturing further includes activating one or more additional peripheral devices of the local device to obtain images of one or more of: a customer identification card, a customer document, a picture of the customer, a customer fingerprint, and a picture of a customer article.

11. A method, comprising:
connecting a local device with a remote device during a transaction being processed on the local device;
establishing a video conference call between an expert operating the local device and a customer operating the remote device;
directing multiple peripherals of the remote device to activate based on an action of the expert during operation of the local device, wherein directing further includes identifying customer preferences from a customer profile with respect to the directing allowing the customer through the customer preferences to determine whether the local device needs a customer consent before the directing or whether the local device does not need the customer consent based on the customer preferences in the customer profile before the directing, wherein directing further includes determining from the customer preferences appropriate permissions and based on the appropriate permissions taking control of the multiple peripherals of the remote device from the local device; and
receiving, automatically, information captured from the multiple peripherals of the remote device as soon as the peripherals obtain the information provided from the remote device, wherein the multiple peripherals include at least one peripheral includes a camera that captures an image of a document presented in front of the camera as a first portion of the information, a printer that prints a document as a second portion of the information, and a peripheral display that permits a signature block to be activated within a screen of the peripheral display and captures a third portion of the information as a signature provided within the signature block.

12. The method of claim 11 further comprising, sending other information from the local device to the remote device.

13. The method of claim 11, wherein directing further includes instructing the remote device to obtain the customer consent from the customer before activating the each of the multiple peripherals based on the customer preferences associated with the customer profile.

14. The method of claim 11, wherein directing further includes sending the document from the local device to the remote device and instructing the peripheral printer interfaced to the remote device to automatically print the document on behalf of the customer as the second portion of the information.

15. The method of claim 11, wherein directing further includes instructing the remote device to present the signature block on the screen of peripheral display for the remote device to obtain an image of the signature for the customer.

16. A portable terminal, comprising:
a display;
peripheral devices; and
an customer-assistance application configured and adapted to:

i) execute on the portable terminal, ii) establish a communication session with a remote device on at least one screen of the display during a transaction being processed, iii) capture images representing information provided by for a customer operating the portable terminal by using a peripheral camera device on the direction of the remote device based on an action of an expert operating the remote device and during the transaction, the action remotely activates the peripheral camera device of the portable terminal, and identify customer preferences from a customer profile with respect to the action and determine through the customer preferences of the customer profile to determine whether the remote device needs a customer consent before the action or whether the remote device does not need the customer consent before the action based on the customer preferences identified in the customer profile, wherein at least one of the images is a picture of the customer or a particular image of a document presented to the peripheral camera device, print a document based on a second action received from the remote device on a peripheral printer device based on a second action of the expert and determine whether to automatically print the document or require the customer consent based on the preferences, and present a signature block on a screen of the display to capture a signature of the customer based on a third action received from the remote device and determine whether to automatically present the signature block on the screen or require the customer consent based on the preferences, and automatically provide control to the remote device of any of the peripheral devices during the communication session based on the customer consent being present in the preferences for the corresponding peripheral devices and iv) automatically send the information to the remote device during the transaction as soon as the peripheral camera device captures the images, wherein the peripheral camera device is integrated into the portable terminal.

17. The portable terminal of claim 16, wherein the customer-assistance application is further configured and adapted to v) establish a live and real time video feed between the portable terminal and the remote device, and vi) only capture images representing information for the customer using the peripheral camera device in response to receiving the customer consent from the customer at the portable terminal based on the customer preferences from the customer profile indicating that the customer consent is required from the customer.

18. The portable terminal of claim 17, wherein the portable terminal further comprises a touch-sensitive panel overlying the display, and the customer-assistance application is further configured and adapted to vii) receive other information from the expert for presentation to the customer during the communication session, and viii) receive the signature from the customer via the touch-sensitive panel within the signature block presented on the screen of the display.

19. The portable terminal of claim 16, wherein the portable terminal is one of:
   a mobile phone, a tablet, and a wearable processing device.

* * * * *